United States Patent
Ma et al.

(10) Patent No.: US 10,437,363 B2
(45) Date of Patent: Oct. 8, 2019

(54) IN-CELL TOUCH PANEL AND TOUCH DISPLAY DEVICE

(71) Applicant: Shanghai Tianma Micro-Electronics Co., Ltd., Shanghai (CN)

(72) Inventors: Jun Ma, Shanghai (CN); Lijun Zhao, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/638,192

(22) Filed: Jun. 29, 2017

(65) Prior Publication Data

US 2017/0300143 A1    Oct. 19, 2017

Related U.S. Application Data

(63) Continuation of application No. 14/088,295, filed on Nov. 22, 2013, now Pat. No. 9,727,155.

(30) Foreign Application Priority Data

Nov. 23, 2012 (CN) .......................... 2012 1 0484619

(51) Int. Cl.
    *G06F 3/041*    (2006.01)
    *G06F 3/044*    (2006.01)
(52) U.S. Cl.
    CPC .............. *G06F 3/041* (2013.01); *G06F 3/044* (2013.01); *G06F 3/0412* (2013.01); *G06F 3/0445* (2019.05); *G06F 3/0446* (2019.05)
(58) Field of Classification Search
    CPC .............................................. G06F 3/041–047
    See application file for complete search history.

(56) References Cited

U.S. PATENT DOCUMENTS

| 6,239,788 B1 | 5/2001 | Nohno et al. |
| 8,199,303 B2 * | 6/2012 | Lee ..................... G02F 1/13458 349/142 |

(Continued)

FOREIGN PATENT DOCUMENTS

| CN | 101866228 A | 10/2010 |
| CN | 101957507 A | 1/2011 |

(Continued)

OTHER PUBLICATIONS

EPO European Search Report for application EP13194263 dated Nov. 2, 2016.

*Primary Examiner* — Gene W Lee
(74) *Attorney, Agent, or Firm* — Alston & Bird LLP (57) ABSTRACT

The invention discloses an In-Cell touch panel and a touch display device. The In-Cell touch panel includes: a color filter substrate; a common electrode disposed on the color filter substrate; an array substrate disposed opposite the color filter substrate; an IC disposed on the array substrate; a plurality of data lines and a plurality of gate lines disposed perpendicular to the data lines are disposed on the array substrate; the common electrode is divided into a plurality of common electrode lines, where the common electrode lines also function as drive electrodes or sense electrodes, and the IC is a timesharing IC used for providing the In-Cell touch panel with display signals and touch drive signals and detecting the touch signals of the In-Cell touch panel. The In-Cell touch panel provided by the present invention can effectively reduce the requirement for load of the timesharing IC by the In-Cell touch panel.

17 Claims, 7 Drawing Sheets

(56) References Cited

U.S. PATENT DOCUMENTS

| | | | | |
|---|---|---|---|---|
| 8,659,559 B2* | 2/2014 | Wu | G06F 3/0412 | 178/18.06 |
| 8,780,065 B2* | 7/2014 | Ribeiro | G06F 3/0412 | 345/173 |
| 8,933,897 B2* | 1/2015 | Liu | G06F 3/0412 | 178/18.06 |
| 9,046,976 B2* | 6/2015 | Liu | G06F 3/0412 | |
| 9,069,421 B2* | 6/2015 | Liu | G06F 3/0412 | |
| 2002/0001053 A1* | 1/2002 | Nakao | G02F 1/1334 | 349/89 |
| 2003/0183805 A1* | 10/2003 | Kobayashi | C09K 19/586 | 252/299.01 |
| 2004/0017527 A1* | 1/2004 | Ryu | G02F 1/13439 | 349/113 |
| 2004/0195963 A1* | 10/2004 | Choi | H01L 27/3213 | 313/504 |
| 2005/0062042 A1 | 3/2005 | Hayashi et al. | | |
| 2005/0231108 A1* | 10/2005 | Furukawa | G02F 1/133305 | 313/506 |
| 2006/0226426 A1* | 10/2006 | Park | G02F 1/13394 | 257/59 |
| 2009/0167975 A1* | 7/2009 | Lee | G02F 1/13458 | 349/43 |
| 2010/0066650 A1* | 3/2010 | Lee | G02F 1/13338 | 345/64 |
| 2010/0289770 A1 | 11/2010 | Lee et al. | | |
| 2010/0309162 A1* | 12/2010 | Nakanishi | G06F 3/044 | 345/174 |
| 2011/0175846 A1* | 7/2011 | Wang | G06F 3/0412 | 345/174 |
| 2012/0154326 A1* | 6/2012 | Liu | G06F 3/0412 | 345/174 |
| 2012/0274603 A1* | 11/2012 | Kim | G06F 3/0412 | 345/174 |
| 2013/0000952 A1* | 1/2013 | Srinivas | H01B 1/02 | 174/126.1 |
| 2013/0050130 A1* | 2/2013 | Brown | G06F 3/044 | 345/174 |
| 2013/0328800 A1* | 12/2013 | Pu | G06F 3/041 | 345/173 |
| 2014/0048854 A1* | 2/2014 | Wang | G06F 3/0412 | 257/254 |
| 2014/0062918 A1* | 3/2014 | Chen | G06F 3/0412 | 345/173 |
| 2014/0062935 A1* | 3/2014 | Bi | G06F 3/0418 | 345/174 |
| 2014/0071066 A1* | 3/2014 | Lee | G06F 3/0416 | 345/173 |
| 2014/0085222 A1* | 3/2014 | Park | G06F 3/0412 | 345/173 |
| 2014/0111466 A1* | 4/2014 | Kim | G06F 3/044 | 345/174 |
| 2014/0111473 A1* | 4/2014 | Yang | G06F 3/044 | 345/174 |
| 2014/0111710 A1* | 4/2014 | Yang | G06F 3/0412 | 349/12 |
| 2014/0285462 A1* | 9/2014 | Lee | G09G 3/3648 | 345/173 |
| 2015/0185524 A1* | 7/2015 | Ye | G02F 1/13338 | 349/12 |

FOREIGN PATENT DOCUMENTS

| | | |
|---|---|---|
| CN | 102339156 A | 2/2012 |
| CN | 102375629 A | 3/2012 |
| CN | 102466907 A | 5/2012 |
| EP | 2447813 A2 | 5/2012 |
| JP | 2003066417 A | 3/2003 |
| WO | WO 2012018121 A1 | 2/2012 |

* cited by examiner

Fugure 8

Fugure 9

IN-CELL TOUCH PANEL AND TOUCH DISPLAY DEVICE

CROSS-REFERENCE TO RELATED APPLICATIONS

This application is a Continuation Application of patent application Ser. No. 14/088,295, filed Nov. 22, 2013, which is hereby incorporated by reference herein in its entirety and which claims priority to Chinese Application No. 201210484619.5 filed on Dec. 23, 2012, which is hereby incorporated by reference herein in its entirety.

FIELD OF THE INVENTION

The present invention relates to flat panel display technologies, and in particularly to an In-Cell touch panel and a touch display device.

BACKGROUND OF THE INVENTION

Since a touch panel embedded in a liquid crystal display device can be integrated with a color filter substrate (i.e. a color filter plate), the thickness of the whole touch display device is effectively reduced and the production process of the device is effectively simplified, thus such a device has been widely used. Generally, drive lines and sense lines used for a touch function are disposed at a side of the color filter substrate in an In-Cell touch panel, but it is difficult to disposed the drive lines and the sense lines used for the touch function at the side of the color filter substrate in a liquid crystal display device of a vertical drive electric field mode such as Twisted Nematic (TN), because a common electrode is disposed at the side of the color filter substrate. In order to achieve the built-in touch function of the liquid crystal display device of the TN mode, it has been proposed that the data lines and the gate lines at a side of an array substrate also function as the drive lines and the sense lines of the touch panel.

Figure 1:
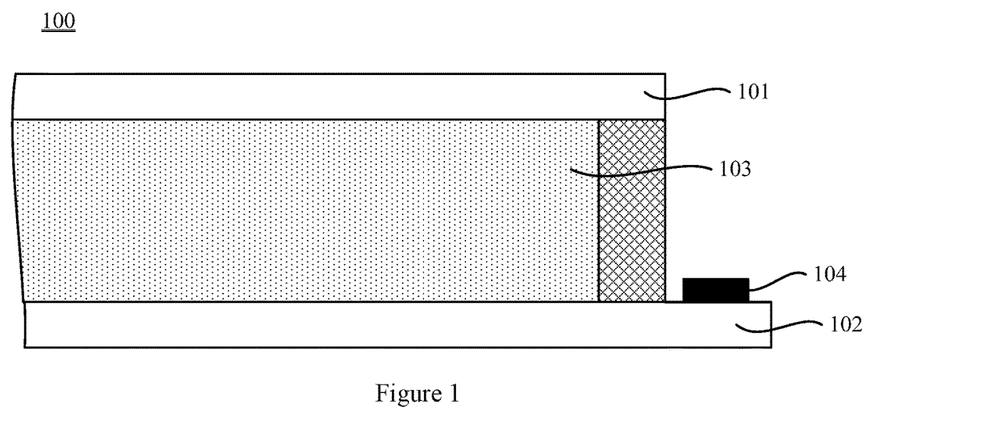
FIG. 1 is a schematic view showing the structure of an In-Cell touch panel in the prior art.

As illustrated in FIG. 1, the In-Cell touch panel 100 includes an array substrate 101, a color filter substrate 102, and a liquid crystal layer 103 sandwiched between the array substrate 101 and the color filter substrate 102. A number of data lines and gate lines are disposed on the array substrate 101, and the color filter substrate is connected with a timesharing Integrated Circuit (IC) 104. The data lines and the gate lines are respectively connected with the timesharing IC 104 through the color filter substrate 102. A frame scanning period of the timesharing IC 104 includes a touch period and a display period, the timesharing IC 104 sends touch drive signals to the data lines and the gate lines, and detects touch signals of the gate lines or the data lines at the same time during the touch period; and the timesharing IC 104 sends display signals to the data lines or the gate lines during the display period. Thus, the timesharing IC 104 not only provides the touch drive signals and the display signals, but also detects the touch signals, hence the load of the timesharing IC 104 is multiplied, and the timesharing IC 104 is unable to support such rapidly increased load especially in the case of a high resolution display device.

In addition, the data lines and the gate lines also function as the drive lines and the sense lines used for the touch function in the above technical solution, thus, for a mutual capacitor touch panel, the data lines and the gate lines are respectively used as plates for the mutual capacitor. However, due to the limited line widths of the data lines and the gate lines, the mutual capacitance of the touch panel caused by them is relatively small, and thus the sensitivity of the touch panel is seriously influenced.

In summary, the data lines and the gate lines also function as the drive lines and the sense lines of the In-Cell touch panel for the liquid crystal display device of a vertical drive electric field, where the In-Cell touch panel is demanding for the timesharing IC and causes the relatively small mutual capacitance of the touch panel, thus the development of such liquid crystal display device is seriously influenced.

SUMMARY OF THE INVENTION

In order to resolve the above technical problem, the present invention provides an In-Cell touch panel including:
a color filter substrate;
a common electrode disposed on the color filter substrate;
an array substrate disposed opposite the color filter substrate;
an IC disposed on the array substrate; and
a plurality of data lines and a plurality of gate lines disposed perpendicular to the data lines are disposed on the array substrate;
wherein, the common electrode is divided into a plurality of common electrode lines, where the common electrode lines also function as drive electrodes or sense electrodes, the IC is a timesharing IC used for providing the In-Cell touch panel with display signals and touch drive signals and detecting touch signals of the In-Cell touch panel.

Accordingly, a touch display device provided by the present invention comprises the In-Cell touch panel and backlight module, with the In-Cell touch panel is fixed within the backlight module.

BRIEF DESCRIPTION OF THE DRAWINGS

FIG. 8 is a schematic view showing the structure of an In-Cell touch panel according to still another embodiment of the invention.

FIG. 9 is a schematic view showing the structure of a touch display device according to an embodiment of the invention.

DETAILED DESCRIPTION OF THE EMBODIMENTS

The concept of the present invention is that the common electrode located on the color filter substrate is divided into a plurality of common electrode lines, where the common electrode lines also function as drive electrodes or sense electrodes, further, the IC located on the array substrate is a timesharing IC, where the IC located on the array substrate is used to provide the In-Cell touch panel with display signals and touch drive signals, and detect touch signals of the In-Cell touch panel. As for the In-Cell touch panel, the timesharing IC doesn't provide all the touch drive signals to the data lines or the gate lines already withstand heavy loads and the data lines or the gate lines already withstand heavy load do not provide all the touch detecting signals during the touch period, instead, the touch drive signals or the touch detecting signals is provided by the common electrode lines withstand a relatively small load. Therefore, the load of the timesharing IC can be reduced during the touch period, for the purpose of reducing the requirements for the load of the timesharing IC by the In-Cell touch panel.

On the other hand, because the line width of the common electrode line is larger than that of the data line or the gate line, the effective relative area of a touch mutual capacitor formed by the above common electrode line and the data line or the gate line is increased, so that the touch mutual capacitance is increased, thus the touch sensitivity can be improved.

Further detailed description will be made below in conjunction with the accompanying drawings in order for better understanding on the object, solutions and advantages of the present invention.

Figure 2:
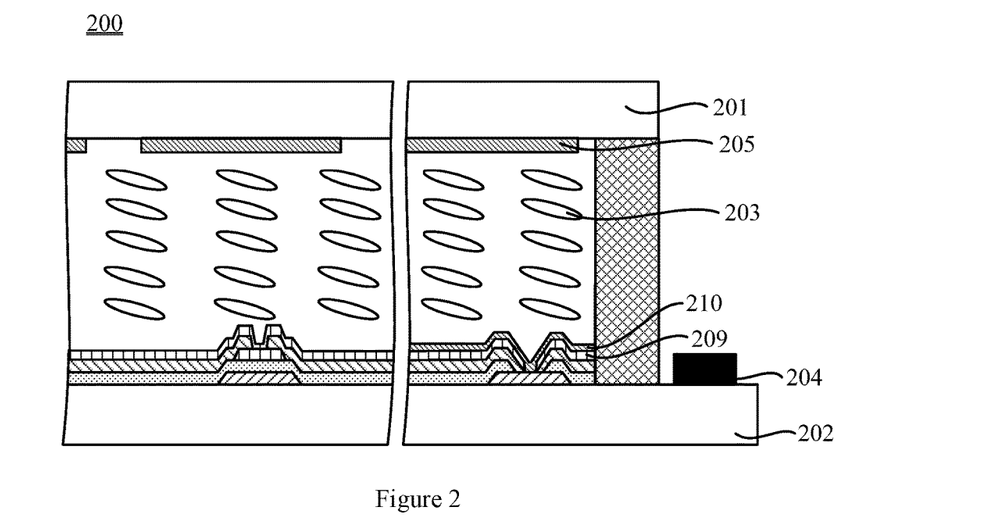
FIG. 2 is a schematic view showing the structure of an In-Cell touch panel according to an embodiment of the invention.

As illustrated in FIG. 2, an In-Cell touch panel 200 of an embodiment of the present invention includes: a color filter substrate 201, an array substrate 202, and a liquid crystal layer 203 disposed between the color filter substrate 201 and the array substrate 202, where the array substrate 202 and the color filter substrate 201 are disposed opposite to each other. A timesharing IC 204 is disposed on the array substrate 202, and used for providing the In-Cell touch panel 200 with display signals and touch drive signals and detecting the touch signals of the In-Cell touch panel 200.

A scanning period of the timesharing IC 204 includes a touch period and a displaying period; the timesharing IC 204 provides the In-Cell touch panel 200 with the touch drive signals and detects the touch signal of the In-Cell touch panel 200 at the same time during the touch period; also, the timesharing IC 204 provides the embedded touch panel 200 with the display drive signals during the displaying period.

Figure 3:
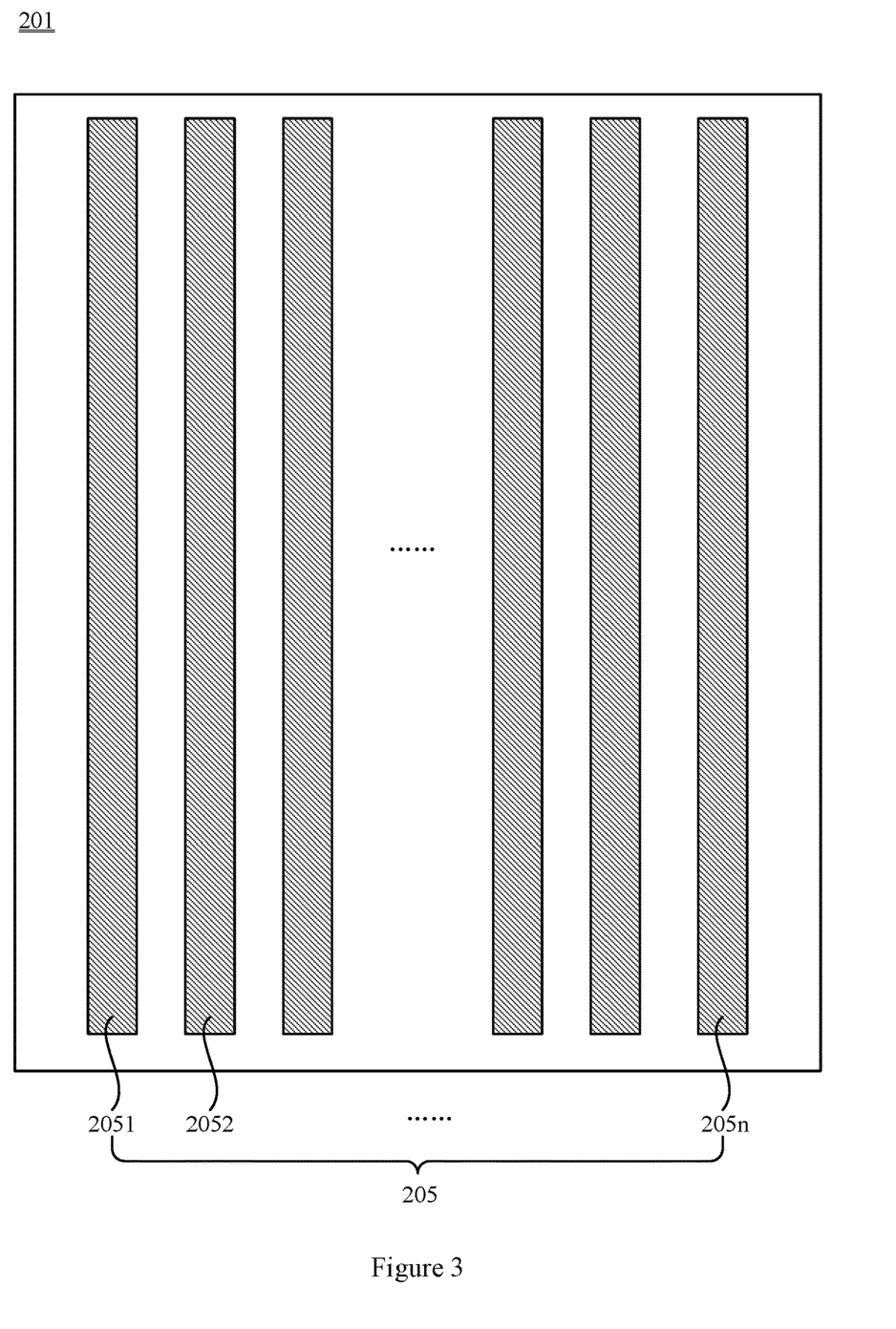
FIG. 3 is a schematic top view of a color filter substrate according to an embodiment of the invention.

As illustrated in FIG. 3 in combination with FIG. 2, a common electrode 205 is divided into a plurality of common electrode lines 2051, 2053, . . . , 205n, where the common electrode 205 is disposed on the color filter substrate 201. The common electrode lines 2051, 2052, . . . , 205n function as drive electrodes or sense electrodes during the touch period of the timesharing IC 204.

Figure 4:
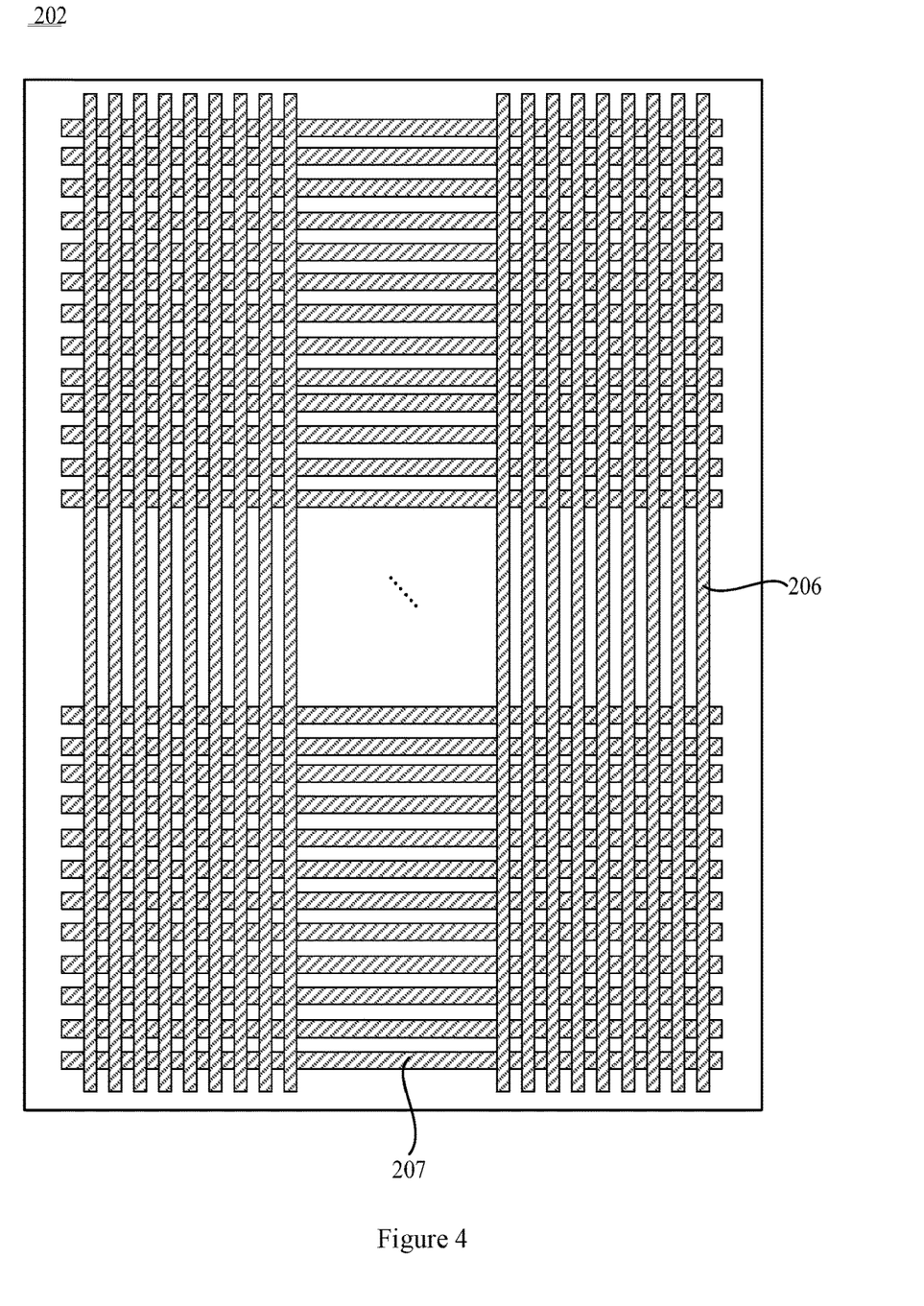
FIG. 4 is a schematic top view of an array substrate according to an embodiment of the invention.

As illustrated in FIG. 4, multiple data lines 206 and multiple gate lines 207 disposed perpendicular to the data lines 206 are formed on the array substrate 202. Multiple data lines 206 or multiple gate lines 207 function as sense electrodes or drive electrodes during the touch period of the timesharing IC 204.

Figure 5:
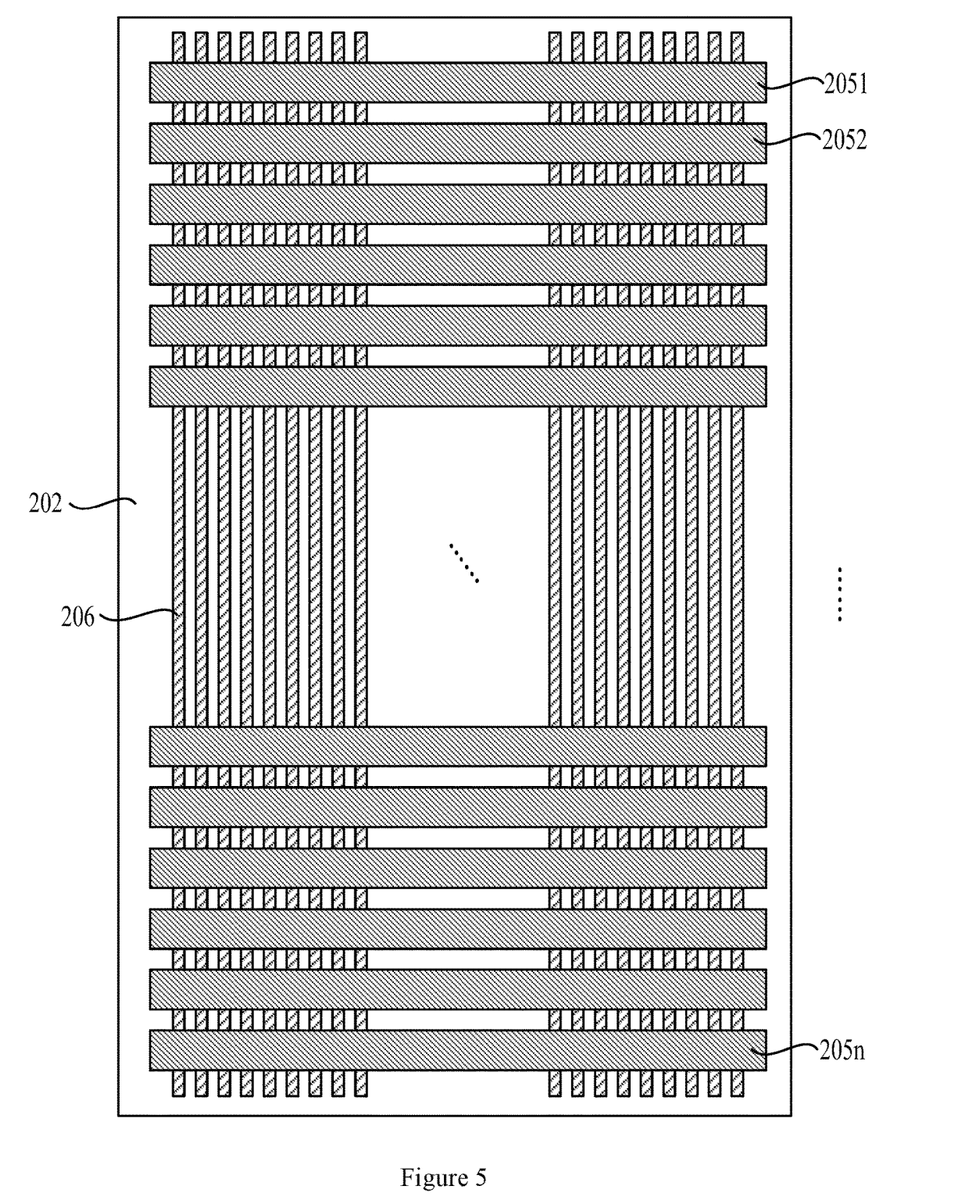
FIG. 5 is a schematic view showing the formation of a touch mutual capacitor according to an embodiment of the invention.

In the present embodiment, as illustrated in FIG. 5, the data lines 206 function as the sense electrodes or drive electrodes, and the common electrode lines 2051, 2052, . . . , 205n are disposed perpendicular to the data lines 206. The common electrode lines 2051, 2052, . . . , 205n function as the drive electrodes when the data lines 206 function as the sense electrodes, and the common electrode lines 2051, 2052, . . . , 205n function as the sense electrodes when the data lines 206 function as the drive electrodes. In other words, two plates of the touch mutual capacitor are respectively the data lines 206 and the common electrode lines 2051, 2052, . . . , 205n. It should be noted for FIG. 5 that the gate lines 207, the color filter substrate 201 and other elements are not shown in FIG. 5 in order to clearly show the relationships of the data lines 206 and common electrode lines 2051, 2052, . . . , 205n.

Figure 6:
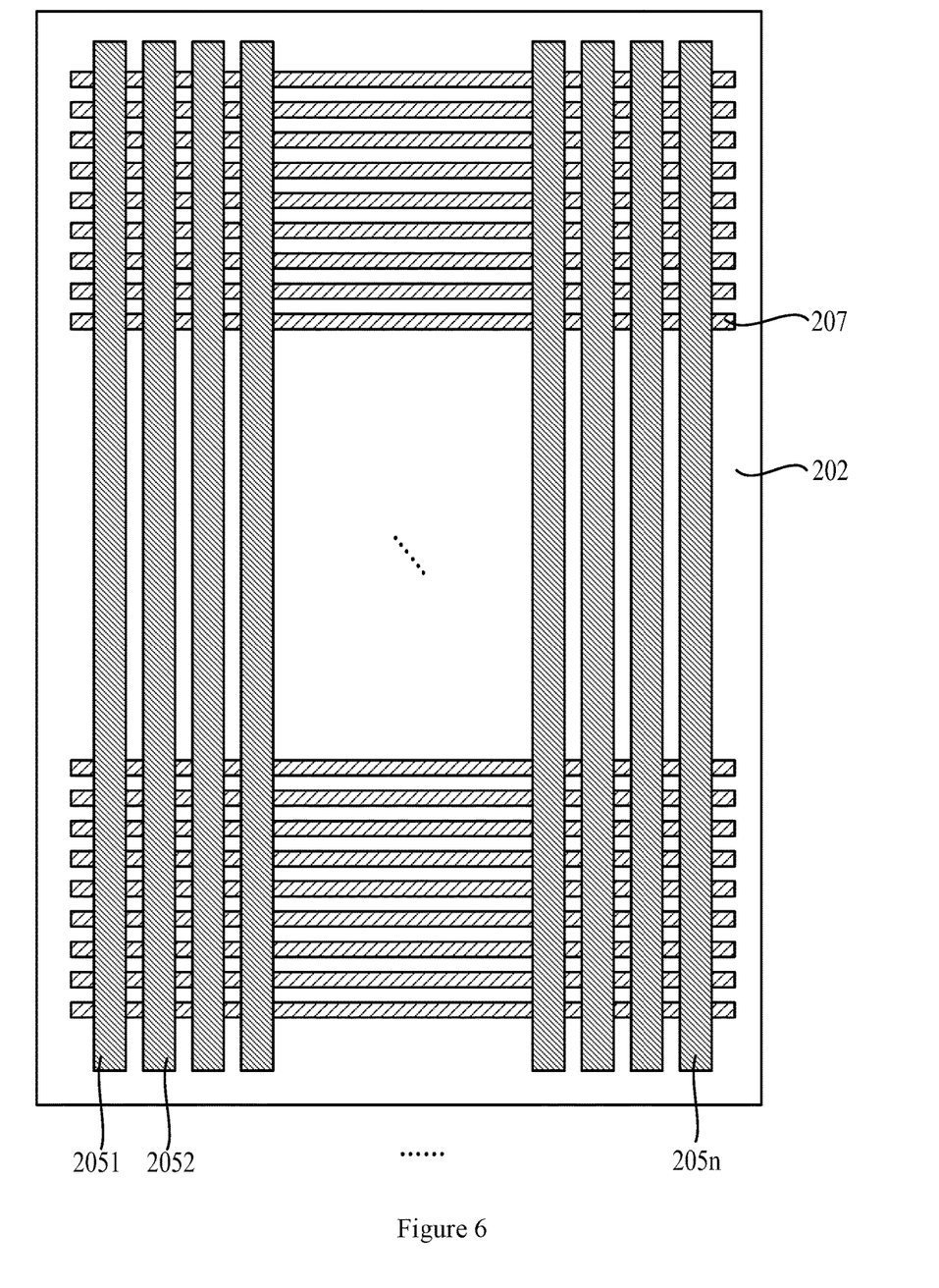
FIG. 6 is a schematic view showing the formation of a touch mutual capacitor according to another embodiment of the invention.

Alternatively, the gate lines 207 can also function as a plate of the touch mutual capacitor. In another embodiment of the present invention, as illustrated in FIG. 6, the gate lines 207 serve as sense electrodes or drive electrodes, and the common electrode lines 2051, 2052, . . . , 205n are disposed perpendicular to the gate lines 207. The common electrode lines 2051, 2052, . . . , 205n serve as the drive electrodes when the gate lines 207 function as the sense electrodes; and the common electrode lines 2051, 2052, . . . , 205n function as the sense electrodes when the gate lines 207 function as the drive electrodes. In other words, two plates of the touch mutual capacitor are respectively the gate lines 207 and the common electrode lines 2051, 2052, . . . , 205n. It should be noted for FIG. 6 that the data lines 206, the color filter substrate 201 and other elements are not shown in FIG. 6 in order to clearly show the relationships of the gate lines 207 and the common electrode lines 2051, 2052, . . . , 205n.

In summary, because the plurality of common electrode lines 2051, 2052, . . . , 205n function as a plate of the touch mutual capacitor, the touch drive signals or the touch signals of the timesharing IC 204 is provided by the plurality of common electrode lines 2051, 2052, . . . , 205n withstand relatively small loads during the touch period, thus effectively reducing the load of the timesharing IC 204.

As illustrated in FIGS. 5 and 6, the common electrode 205 is divided into the plurality of common electrode lines 2051, 2052, . . . , 205n, it is possible that the line widths of the common electrode lines 2051, 2052, . . . , 205n are larger than those of the data lines 206 or the gate lines 207. Preferably, the range of the line widths of the common electrode lines 2051, 2052, . . . , 205n is 3 mm~5 mm.

On the array substrate 202, the plurality of data lines 206 intersect with the plurality of gate lines 207 to define a plurality of pixels in an array, and the pixels are divided into multiple pixel rows and multiple pixel columns. After the common electrode 205 is divided into multiple common electrode lines 2051, 2052, . . . , 205n, the various pixel rows or columns may be charged inconsistently. In order to avoid uneven display caused by the inconsistent charging, the plurality of common electrode lines 2051, 2052, . . . , 205n can be disposed to overlap with the plurality of pixel rows or columns. Preferably, the width of each of the plurality of common electrode lines 2051, 2052, . . . , 205n is equal to the width of the pixel row or column, in this case, the In-Cell touch panel can be driven in a row/column inversion driving mode, or the shift register circuit of the array substrate may be selectively used to transfer signals for the color filter substrate, so that the driving designs can be selected more widely and be more flexible.

As illustrated in FIG. 2, two plates of the touch mutual capacitor are the common electrode lines 2051, 2052, . . . , 205n and the data lines 206 or the gate lines 207, and a dielectric layer between the two plates of the touch mutual capacitor includes the liquid crystal layer 203. In the liquid crystal display device with a vertical drive electric field, the angles between the liquid crystal molecules and the color filter substrate 201 or the array substrate 202 vary with the drive voltages. Because the liquid crystal molecules are polar molecules, when the angles between the liquid crystal molecules and the color filter substrate 201 are changed, means that the dielectric constant of the dielectric layer between the two plates of the touch mutual capacitor is changed, so that the touch mutual capacitance per se is changed. However, such change of the touch mutual capacitance is not caused by the external touch and thus is not a real touch signal, therefore, such change of the touch mutual capacitance caused by the rotation of the liquid crystal molecules is noise for the timesharing IC 204 used for detecting the touch signals.

In order to reduce the above noise caused by the rotation of the liquid crystal molecules, a layer of organic film is added between the two plates of the touch mutual capacitor, that is, the dielectric layer of the touch mutual capacitor includes the liquid crystal layer 203 and the organic film, to alleviate the variation of the dielectric constant of the whole dielectric layer caused by the rotation of the liquid crystal molecules. Specifically, an organic film made of acrylic copolymer resin is disposed on the color filter substrate 201 or the array substrate 202.

Figure 7:
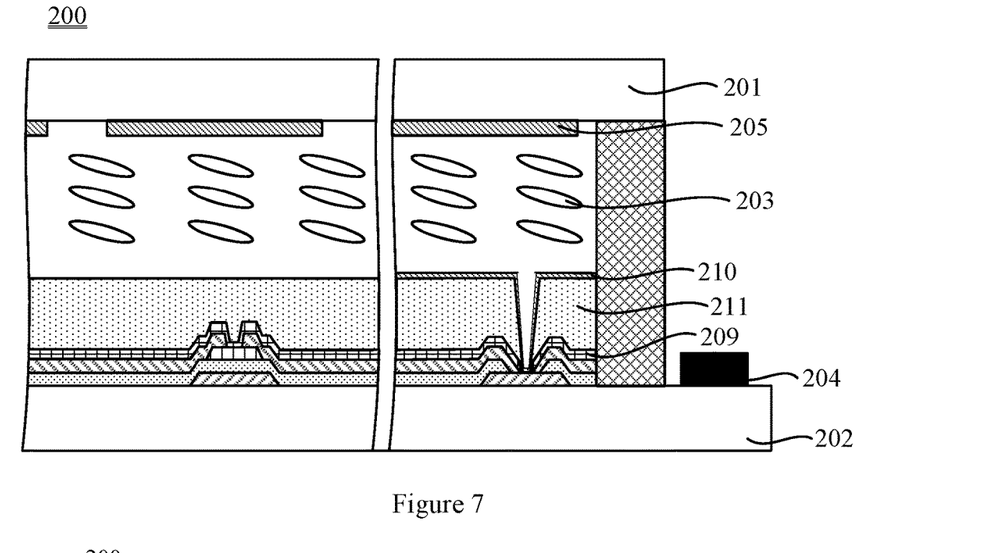
FIG. 7 is a schematic view showing the structure of an In-Cell touch panel according to still another embodiment of the invention.

More specifically, as illustrated in FIG. 7, on the array substrate 202, further comprises a protect layer 209 disposed on the data lines 206, as well as a pixel electrode layer 210 disposed above the protect layer 209. An organic film layer 211 having a thickness of a range of 1 µm~3 µm is disposed between the protect layer 209 and the pixel electrode layer 210. Of course, the organic film 211 can be alternatively disposed on a side of the common electrode 205, where the side is toward the array substrate 202 (not shown).

Of course, in still another embodiment of the present invention, in order to effectively reduce the variation of the dielectric constant of the whole dielectric layer caused by the rotation of the liquid crystal molecules, as illustrated in FIG. 8, an organic film is disposed on each of the color filter substrate 201 and the array substrate 202. In particular, a first organic film 212 is disposed between the protect layer 209 and the pixel electrode layer 210, and a second organic film 213 is disposed on a side of the common electrode 205, where the side is toward the array substrate 202. Preferably, the thicknesses of the first organic film 212 and the second organic film 213 are in a range of 0.5 µm~1.5 µm.

Accordingly, as illustrated in FIG. 9, the present invention further comprises a touch display device 300 including the In-Cell touch panel 200 and a backlight module 400, while the In-Cell touch panel 200 is fixed in the backlight module 400. To assem the touch display device 300, the array substrate 202 is disposed to face a user, while the color filter substrate 201 is disposed to face the backlight module 400, so that when the user touches the In-Cell touch panel 200, the user is closer to the touch mutual capacitor to improve the touch sensitivity.

In summary, the common electrode on the color filter substrate is divided into a plurality of common electrode lines, and the common electrode lines also function as the drive electrodes or the sense electrodes. As for the above In-Cell touch panel, during the touch period of the timesharing IC, not all of the touch drive signals are provided to the data lines or the gate lines, where the data lines or the gate lines already withstand very heavy loads, and not all of the touch detecting signals are provided by the gate lines and the data lines already withstand the very heavy loads, and one of the touch drive signals or the touch detecting signals is provided by the common electrode lines withstand a less load. Accordingly, the load of the timesharing IC during the touch period can be reduced for the purpose of reducing the requirements for the load of the timesharing IC by the In-Cell touch panel.

On the other hand, the line width of the common electrode line is larger than the line width of the gate line or the gate line, so that the effective relative area of the touch mutual capacitor formed by the above common electrode line and the data lines or the gate lines is increased to increase the touch mutual capacitance, and hence to improve the touch sensitivity. Meanwhile, an organic film is added between two plates of the touch mutual capacitor to reduce the influence on the dielectric constant of the whole medium layer caused by the rotation of the liquid crystal molecules, to further improve the touch sensitivity.

Apparently, the skilled in the art can make various changes and modifications to the present invention without departing from the spirit and scope of the present invention. Therefore, if the changes and the modifications on the present invention are within the scope of the claims and their equivalent technologies, the present invention are intend to include these changes and modifications.

We claim:

1. A touch display device, comprising:
   an in-cell touch panel and a backlight module,
   wherein the in-cell touch panel comprises:
     an array substrate;
     a color filter substrate positioned opposite to the array substrate and arranged between the array substrate and the backlight module;
     a layer of liquid crystals disposed in between the color filter substrate and the array substrate; and
     a plurality of common electrode lines configured to function as drive electrodes or sense electrodes;
   wherein the color filter substrate has a first surface and a second surface opposite to the first surface, wherein the backlight module is fixed to the first surface of the color filter substrate, and wherein the plurality of common electrode lines are disposed on the second surface of the color filter substrate.

2. The touch display device according to claim 1, wherein the array substrate comprises a plurality of data lines and a plurality of gate lines, wherein the gate lines are perpendicular to the data lines.

3. The touch display device according to claim 2, wherein the plurality of common electrode lines extend in a first direction, the plurality of data lines extend in a second direction, and the first direction is perpendicular to the second direction.

4. The touch display device according to claim 3, wherein the plurality of common electrode lines function as the drive electrodes and the plurality of data lines function as the sense electrodes.

5. The touch display device according to claim 3, wherein the plurality of common electrode lines function as the sense electrodes and the plurality of data lines function as the drive electrodes.

6. The touch display device according to claim 2, wherein the plurality of common electrode lines extend in a first direction, the plurality of gate lines extend in a second direction, and the first direction is perpendicular to the second direction.

7. The touch display device according to claim 6, wherein the plurality of common electrode lines function as the drive electrodes and the plurality of gate line function as the sense electrodes.

8. The touch display device according to claim 6, wherein the plurality of common electrode lines function as the sense electrodes and the plurality of gate lines function as the drive electrodes.

9. The touch display device according to claim 2, wherein the array substrate further comprises:

a protect layer formed directly on the plurality of data lines, a first organic film layer formed on the protect layer, and a pixel electrode layer formed on the first organic film layer, wherein the first organic film layer comprises acrylic copolymer resin.

10. The touch display device according to claim 9, wherein the in-cell touch panel further comprises a second organic film layer, wherein the second organic film layer is between the plurality of common electrode lines and the layer of liquid crystals.

11. The touch display device according to claim 10, wherein a thickness of the second organic film is within 0.5 um to 1.5 um.

12. The touch display device according to claim 1, wherein the in-cell touch panel further comprises an Integrated Circuit (IC) disposed on a periphery area of the array substrate, wherein the IC is configured to perform a timesharing function for providing display signals and touch drive signals, and wherein the IC is further configured to detect touch signals, and wherein a scanning period of the IC includes a touch period and a display period, and wherein, during the touch period, the IC provides the touch drive signals and detects the touch signals, and wherein, during the display period, the IC provides the display drive signals.

13. The touch display device according to claim 1, wherein a line width of each common electrode line of the plurality of common electrode lines is between about 3 mm and about 5 mm.

14. The touch display device according to claim 1, wherein the array substrate further comprises a plurality of pixels arranged in pixel rows and pixel columns, and wherein a width of each common electrode line of the plurality of common electrode lines is equal to a width of a pixel row or a pixel column.

15. The touch display device according to claim 1, wherein the array substrate comprises a plurality of data lines and a plurality of gate lines, wherein a line width of each of common electrode line of the plurality of common electrode lines is greater than a line width of each data line of the plurality of data lines.

16. The touch display device according to claim 1, wherein the array substrate comprises a plurality of data lines and a plurality of gate lines, wherein a line width of each common electrode line of the plurality of common electrode lines is greater than a line width of each gate line of the plurality of gate lines.

17. The touch display device according to claim 1, wherein the array substrate has a first surface and a second surface opposite to the first surface, wherein the first surface faces the layer of liquid crystals, and wherein the second surface is viewable by the user.

* * * * *